United States Patent
Anderton et al.

[19]

[11] Patent Number: 6,105,969

[45] Date of Patent: *Aug. 22, 2000

[54] TRACK JOINT SEALING ASSEMBLY FOR SEALING A TRACK JOINT IN A TRACK CHAIN

[75] Inventors: Peter W. Anderton; Michael H. Haselkorn, both of Peoria; William A. Holt, Dunlap; Jerry A. Metz, Morton; Daniel L. Mikrut, Peoria; Kenneth R. Watts, Washington; Harry M. Yousefnia, Peoria, all of Ill.

[73] Assignee: Caterpillar Inc., Peoria, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/884,239

[22] Filed: Jun. 27, 1997

Related U.S. Application Data

[62] Division of application No. 08/690,630, Jul. 30, 1996, Pat. No. 5,826,884.

[51] Int. Cl.7 ........................................ F16J 15/34
[52] U.S. Cl. ..................... 277/405; 277/943; 305/103; 384/907.1
[58] Field of Search ................... 277/380, 399, 277/405, 943; 384/297, 276, 907.1, 913; 305/102, 103

[56] References Cited

U.S. PATENT DOCUMENTS

| | | | |
|---|---|---|---|
| 3,469,891 | 9/1969 | Deli | 305/103 |
| 3,554,560 | 1/1971 | Miyake | 305/102 X |
| 3,624,809 | 11/1971 | Beckaga | 277/405 |
| 3,874,680 | 4/1975 | Mustoe et al. | 277/405 |
| 3,926,443 | 12/1975 | Fenerty et al. | 277/405 |
| 4,099,728 | 7/1978 | Wiese | 277/399 |
| 4,327,921 | 5/1982 | Reinsma et al. | 277/3 |
| 4,704,332 | 11/1987 | Brennan et al. | 428/428 |
| 4,848,935 | 7/1989 | Seibig et al. | 384/276 |
| 5,050,764 | 9/1991 | Voss | 277/642 X |
| 5,094,466 | 3/1992 | Baker et al. | 277/392 X |
| 5,183,318 | 2/1993 | Taft et al. | 305/104 X |
| 5,257,858 | 11/1993 | Taft | 305/104 X |
| 5,302,012 | 4/1994 | Dester et al. | 305/100 X |

FOREIGN PATENT DOCUMENTS

| | | |
|---|---|---|
| 157834 | 1/1953 | Australia . |
| 2013337 | 4/1970 | France . |
| 3249481 | 7/1991 | Japan . |

*Primary Examiner*—Eric K. Nicholson
*Assistant Examiner*—Greg Binda
*Attorney, Agent, or Firm*—William C. Perry; Kevin M. Kercher

[57] ABSTRACT

A track seal assembly (174) adapted to seal a track joint (172) includes a track link and a ceramic seal member (186). The track seal further includes an elastomeric member (176) positioned between the track link and the ceramic seal member (186). The track seal (174) further includes a bushing (184) having a ceramic end face (187). The end face (87) of the bushing defines a ceramic bushing face (187) that interfaces with the ceramic seal member (186) so as to form a seal interface.

3 Claims, 12 Drawing Sheets

Fig_2_

Fig_4_

Fig_5_

Fig_6_

Fig_7_

Fig_8_

Fig_9_

Fig_10_

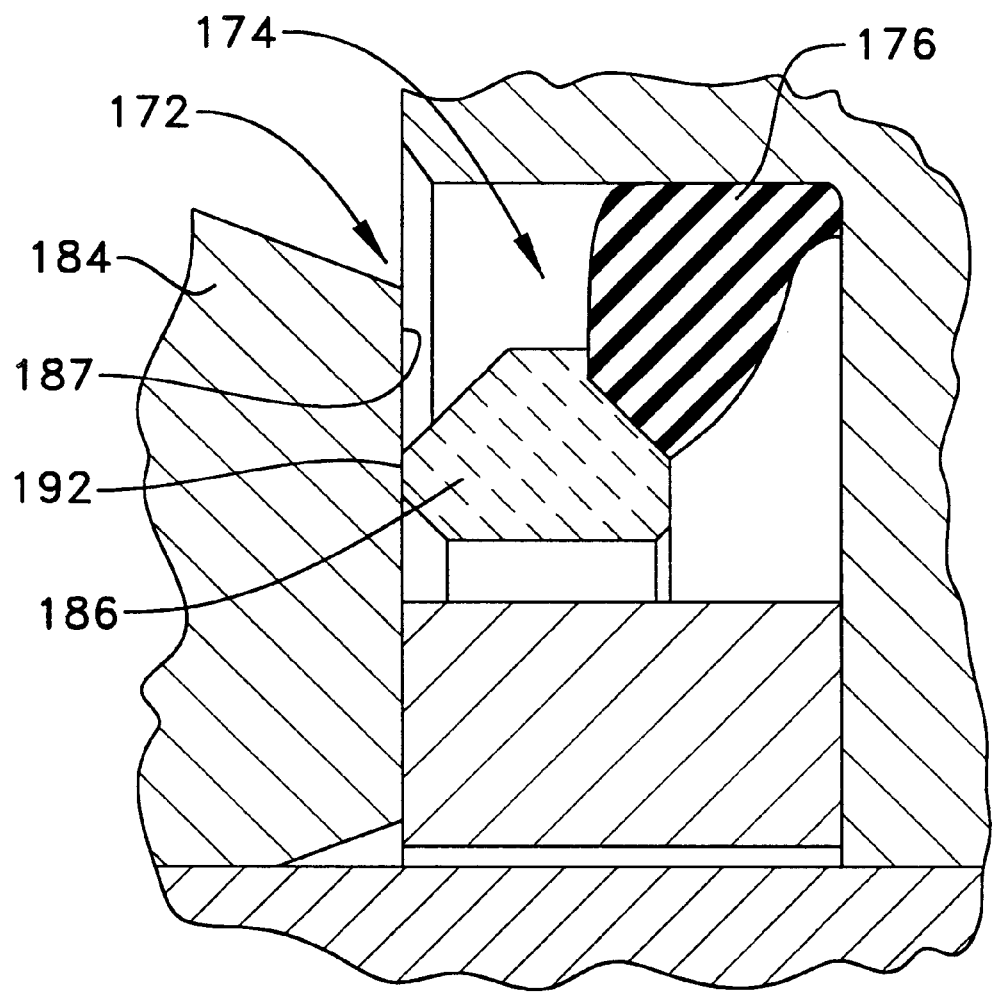
Fig_12_

TRACK JOINT SEALING ASSEMBLY FOR SEALING A TRACK JOINT IN A TRACK CHAIN

This is a divisional application of application Ser. No. 08/690,630, filed Jul. 30, 1996 U.S. Pat. No. 5,826,884.

BACKGROUND OF THE INVENTION

The present invention generally relates to sealing joints in moving vehicles, and more particularly relates to an apparatus for sealing a track joint in a track chain of a crawler tractor.

Crawler tractors, such as a bulldozer, typically have a sprocket, an idler, a track chain and a number of track shoes attached to the track chain for propelling the tractor over the ground. During use of the crawler tractor the sprocket rotates and engages the track chain, thereby causing the track chain, along with the attached track shoes, to rotate around a path defined by the sprocket and the idler. The rotation of the track chain causes the track shoes to engage the ground, thereby propelling the crawler tractor over the ground to perform various work functions.

Track chains generally include a pair of parallel chains, with each parallel chain being made up of a series of entrained master links and track links. Track chains further include a series of pins and bushings interposed between and connected to the parallel chains. The bushings and the entrained track links cooperate to form a number of track joints which allow the necessary movement of the bushings relative to the track links during use of the track chain, for example when the track chain rotates about the sprocket and the idler. Track joints are typically equipped with a track seal assembly to keep out various corrosive and abrasive mixtures of water, dirt, sand, rock or other mineral or chemical elements to which the track chain is exposed during its use. The track seal assembly also functions to keep a lubricant within the track joint to facilitate the aforementioned relative movement of the bushings and the track links.

One prior art track seal assembly design used to accomplish the aforementioned functions employs a sealing member axially urged into sliding sealing engagement against a polished bushing face by a resilient rubber load ring. However, a number of problems have been encountered using this seal design over long periods of time.

One such problem relates to grooving of the bushing face. The mixtures of various abrasive particles found in the working environment of a track chain tend to make excellent grinding compounds which can wear grooves into the bushing face. If these grooves become sufficiently deep, the integrity of the track seal assembly can be compromised and abrasive particles can enter the track joint. These grooves also provide a path for lubricants contained within the track joint to leak out. Moreover, since the sealing member slidably contacts the bushing face (i.e. the bushing face is a dynamic sealing surface), a grooved or rough bushing face can accelerate the sealing member's wear as these two elements slide relative to each other. This acceleration can further degrade the integrity of the track seal assembly, thus increasing the probability that abrasive particles will enter the track joint. All of the above discussed problems can result in the premature failure of the track joint and thus the track chain.

Therefore, in light of the above discussion, it is apparent that an assembly for sealing a track joint in a track chain which addresses the aforementioned problems is desirable.

Following one approach, the present invention provides such a track seal assembly eliminates use of any of the track joint components (such as a bushing face) as a dynamic sealing surface. In another approach, the present invention provides a track seal assembly which has one or more of its components made of an extremely hard, corrosive and abrasive resistant compound, such as a ceramic material.

Using the above discussed approaches, the track seal assemblies of the present invention provide a durable, reliable, low cost solution to the previously described problems experienced with prior art sealing assemblies. The track seal assemblies of the present invention also isolate its ceramic components from potentially damaging forces generated during the use of the track chain. Moreover, the design of the disclosed track seal assemblies allow them to be retrofit into current track link geometry. Furthermore, track seal assemblies of the present invention eliminate the use of track joint components as dynamic sealing surfaces.

SUMMARY OF THE INVENTION

In accordance with one embodiment of the present invention, there is provided a track seal assembly adapted to seal a track joint. The track seal assembly includes a track link and a first ceramic seal member. The track seal assembly further includes a first elastomeric member positioned between the track link and the first ceramic seal member. Additionally, the track seal assembly includes a bushing having an end face. The track seal assembly also includes a second ceramic seal member secured to the end face of the bushing, wherein the first ceramic seal member contacts the second ceramic seal member so as to form a seal interface.

Pursuant to another embodiment of the present invention, there is provided a track seal assembly adapted to seal a track joint. The track seal assembly includes a track link and a first ceramic seal member. The track seal assembly further includes a spring member positioned between the track link and the first ceramic member. Additionally, the track seal assembly includes a bushing having an end face. The track seal assembly also includes a second ceramic seal member secured to the end face of the bushing, wherein the first ceramic seal member contacts the second ceramic seal member so as to form a seal interface.

According to yet another embodiment of the present invention there is provided a track seal assembly adapted to seal a track joint. The track seal assembly includes a track link and a first ceramic seal member. The track seal assembly further includes a first elastomeric member positioned between the track link and the first ceramic member. The track seal assembly additionally includes a bushing having an end face, the end face having a counter bore defined therein. The track seal assembly also includes a second sealing member positioned within the counter bore, wherein the ceramic seal member contacts the second sealing member so as to form a seal interface.

According to still another embodiment of the present invention there is provided a track seal assembly adapted to seal a track joint. The track seal assembly includes a track link and a ceramic seal member. The track seal assembly further includes a spring member positioned between the track link and the first ceramic member. The track seal assembly additionally includes a bushing having an end face, wherein the spring member forces the ceramic seal member into contact with the end face of the bushing so as to form a seal interface.

It is therefore an object of the present invention to provide a new and useful track seal assembly.

It is another object of the present invention to provide an improved track seal assembly.

It is still another object of the present invention to provide a track seal assembly which is durable.

It is another object of the present invention to provide a track seal assembly which does not require a smooth or polished bushing face.

It is still another object of the present invention to provide a track seal assembly which eliminates the use of track joint components as dynamic sealing surfaces.

It is moreover an object of the present invention to provide a track seal assembly which allows relative movement of a bushing and a track link while maintaining a seal.

The above and other objects, features, and advantages of the present invention will become apparent from the following description and attached drawings.

BRIEF DESCRIPTION OF THE DRAWINGS

FIG. 12 is an enlarged cross sectional view of a seventh embodiment of the track seal assembly of the present invention.

DETAILED DESCRIPTION OF THE PREFERRED EMBODIMENTS

Figure 1:
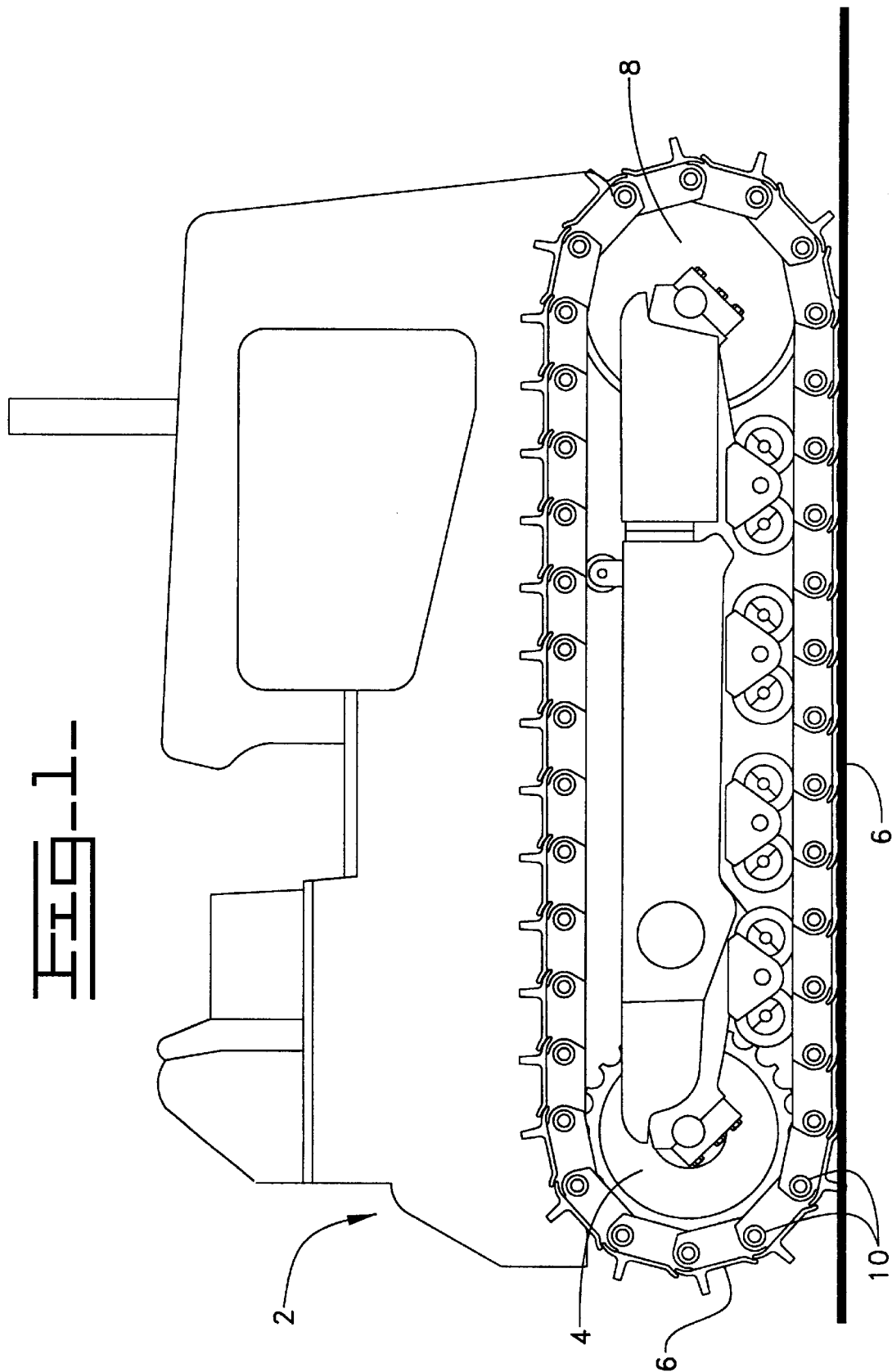
FIG. 1 is a fragmentary view of a crawler tractor having track shoes coupled to a track chain which incorporates the features of the present invention therein.

While the invention is susceptible to various modifications and alternative forms, specific embodiments thereof have been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Now referring to FIG. 1, there is shown a crawler tractor 2 having a sprocket 4, an idler 8, a track chain 10 entrained around sprocket 4 and idler 8, and a number of track shoes 6 attached to the track chain 10. In order to propel crawler tractor 2 over the ground, sprocket 4 rotates and engages track chain 10. This engagement and rotation causes track chain 10, along with the attached track shoes 6, to rotate around a path defined by sprocket 4 and idler 8. Rotation of track chain 10 and track shoes 6 around this path causes the track shoes 6 to engage the ground. The engagement of track shoes 6 with the ground causes the crawler tractor 2 to be propelled over the ground to perform various work functions.

Figure 2:
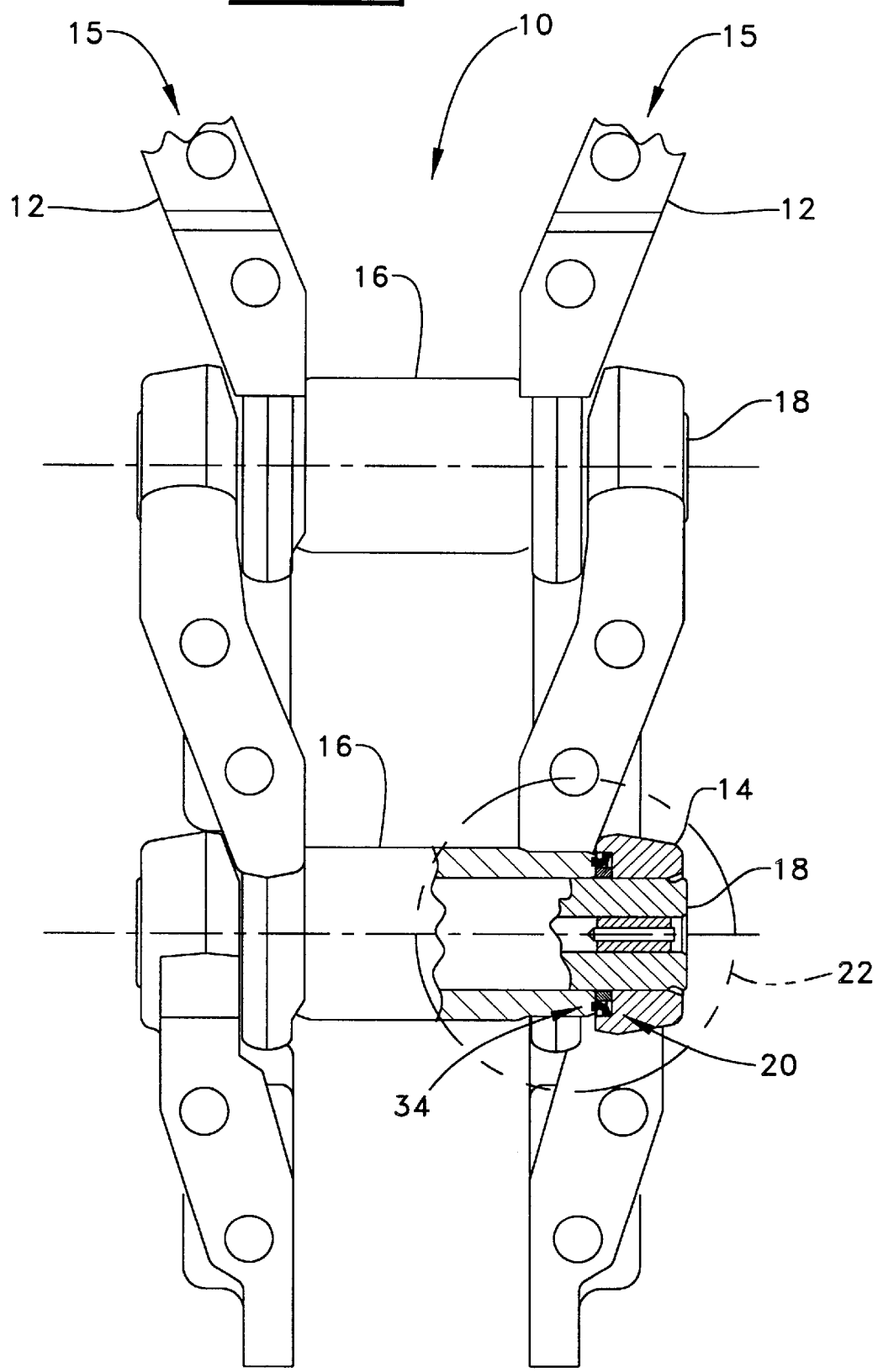
FIG. 2 is a fragmentary elevational view of the track chain of FIG. 1 (note that the track shoes have been removed, and a portion of the track chain is shown in a cross sectional view, for clarity of description)

Now referring to FIG. 2, there is shown a section of track chain 10 of FIG. 1, with track shoes 6 removed for clarity of description. Track chain 10 includes a series of master links 12 and track links 14 entrained to form a pair of parallel chain components 15. Track chain 10 also includes a series of cylindrically shaped bushings 16 and pins 18 interposed between and connecting chain components 15.

As shown by the cross sectional view indicated in circle 22, bushing 16 and track link 14 cooperate to form an annular track joint 20 which surrounds a track pin 18 contained within bushing 16 and track link 14. Note that track link 14 forms a ring-like structure. Track joint 20 allows for the radial and axial movement of bushing 16 and track link 14 relative to longitudinal axis 39 (see FIG. 3) of track pin 18 during use of track chain 10. Track joint 20 also allows for the rotational movement of bushing 16. relative to track link 14. These types of movement are necessary for using track chain 10 since the track chain must articulate at each track joint 20 as the track chain rotates about sprocket 4 and idler 8 during use of crawler tractor 2. Such movement can also occur when track shoes 6, which are coupled to track chain 10, encounter and drive over an obstacle such as a rock. Also shown in the cross sectional view indicated in circle 22 (see FIG. 3 for more detail), track joint 20 has disposed therein a track seal assembly 34 for keeping a lubricant in, and debris out of a portion of, track joint 20.

Figure 3:
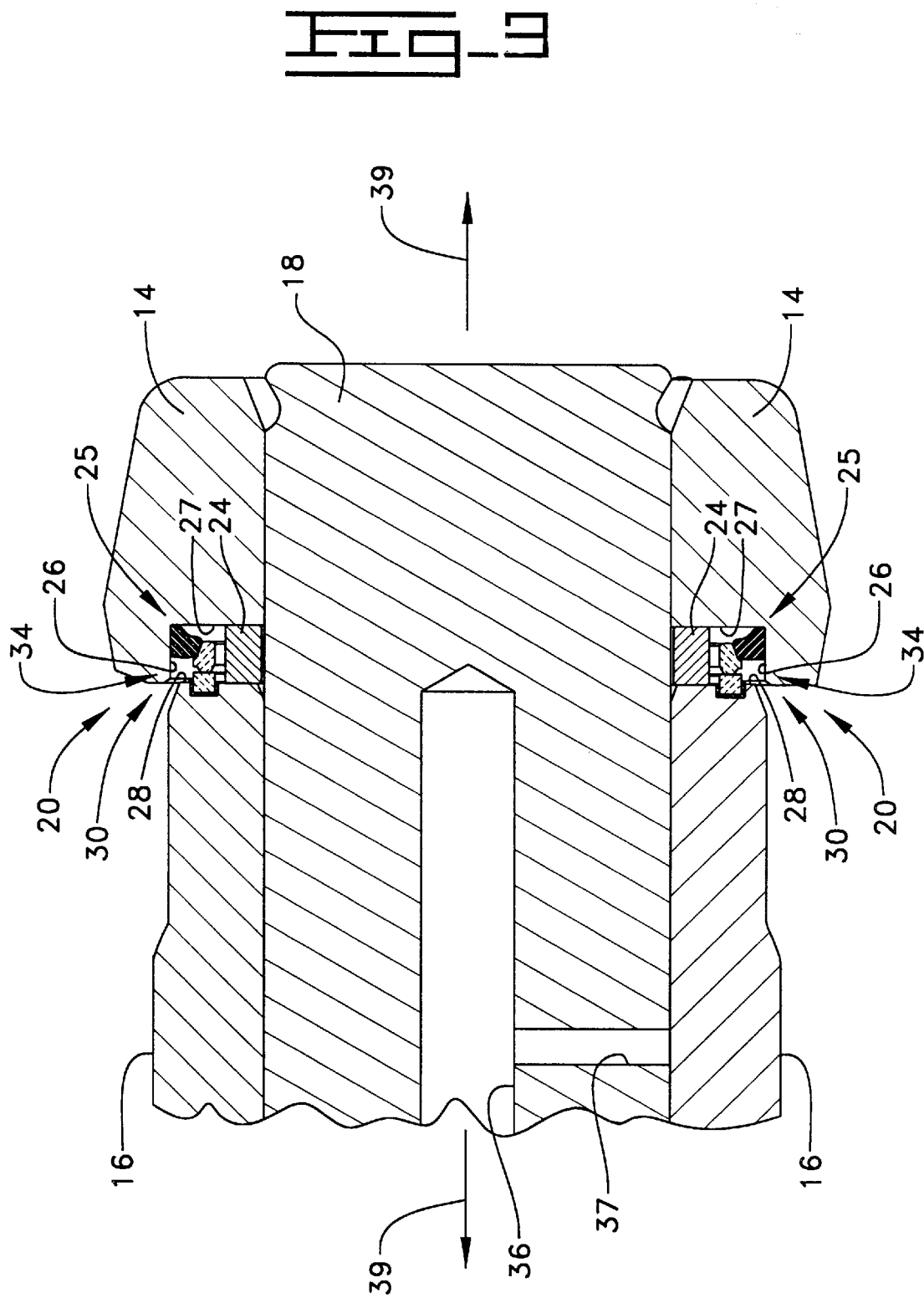
FIG. 3 is an enlarged view of the cross section shown in FIG. 2.

Track joint 20 and track seal assembly 34 will now be described in further detail with reference to FIGS. 3–6. FIG. 3 is an enlarged illustration of the cross sectional view shown in circle 22 of FIG. 2. As shown in FIG. 3, track pin 18 is contained within, and is supported by, bushing 16 and track link 14. Track link 14 includes a track link counter bore 25, defined by an axial extending cylindrical surface 26 and a radially extending end surface 27. Cylindrically shaped bushing 16 has an end portion which defines a ring-shaped bushing face 28. Bushing face 28 includes an annular bushing face counter bore 30 or groove defined therein for receiving an elastomeric material 40 (see FIG. 4). Bushing face 28 is disposed in an opposing relationship to track link counter bore 25 to form track joint 20.

It should be understood that track joint 20 is an annular chamber which surrounds, and is in a substantially concentric relationship with, track pin 18. A thrust ring 24 is disposed intermediate bushing face 28 and radially extending end surface 27 to limit relative movement in the axial direction therebetween. A track seal assembly 34 is also disposed in track joint 20. It should also be understood that track seal assembly 34 and thrust ring 24 both form ring-like structures which are in a substantially concentric relationship with track pin 18.

The above described arrangement of the aforementioned components results in a seal cavity 56 (see FIG. 4) being formed in track joint 20 by the cooperation of bushing face 28, track seal assembly 34, radially extending end surface 27 and thrust ring 24. Seal cavity 56 functions to contain a lubricant for aiding in the-articulation of bushing 16 and track link 14 at track joint 20. With respect to lubricating the components of track chain 10, it should be understood that pin 18 has an axial bore 36 in fluid communication with a cross hole 37. Axial bore 36 and cross hole 37 function to deliver a lubricant to a space (not shown) between pin 18 and bushing 16.

Figure 4:
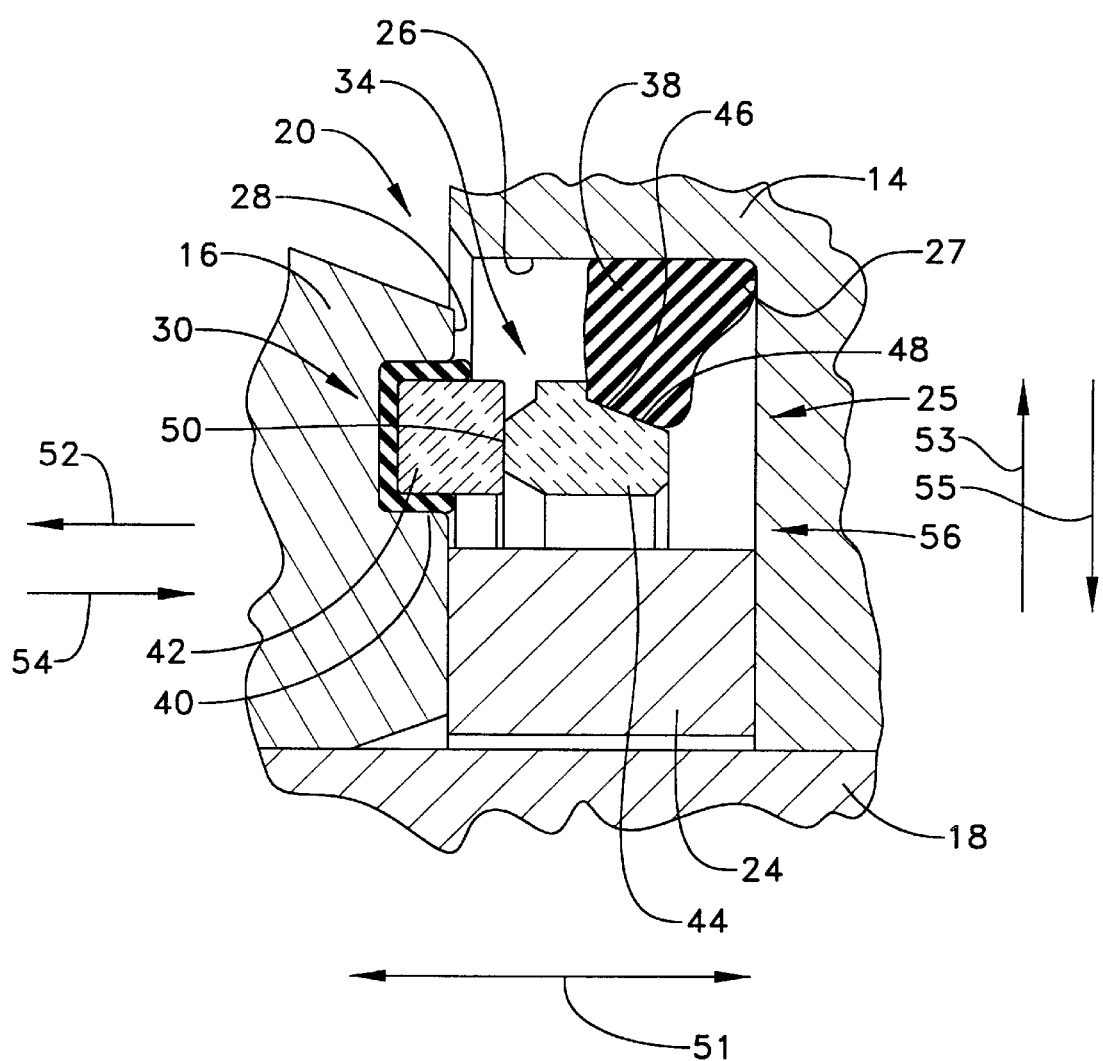
FIG. 4 is an enlarged view of the track joint shown in FIG. 3.

FIG. 4 is an enlarged view of track joint 20 shown in FIG. 3. As shown in FIG. 4, track seal assembly 34 includes elastomeric material 40 disposed in bushing face counter bore 30. Elastomeric material 40 can be secured to bushing face counter bore 30 with any appropriate adhesive, or it can be frictionally fit therein. Alternatively, elastomeric material 40 can be molded in place between bushing face counter bore 30 and a first ceramic sealing member 42.

First ceramic sealing member 42, having a nearly rectangular shaped cross section, is then positioned in bushing face counter bore 30 in frictional engagement with elastomeric material 40. The frictional engagement between elastomeric material 40 and first ceramic sealing member 42 prevents any relative movement between these elements and provides a static seal therebetween during operation of track joint 20. If necessary, an appropriate adhesive can be disposed between elastomeric material 40 and first ceramic sealing member 42 to prevent any relative movement therebetween during operation of track joint 20. First ceramic sealing member 42 is positioned in bushing face counter bore 30 such that a portion of the same extends outward from bushing face 28. Track seal assembly 34 also includes a second ceramic sealing member 44 positioned within track joint 20 such that second ceramic sealing member 44 forms a slideable sealing interface 50 against first ceramic sealing member 42.

Preferably, first ceramic sealing member 42 and second ceramic sealing member 44 are made from any of the following materials, silicon carbide, aluminum oxide, zirconium oxide or silicon nitride.

Track seal assembly 34 further includes an elastomeric or synthetic rubber ring-shaped load member 38. Load member 38 is positioned between radially extending end surface 27, second ceramic sealing member 44, and axial extending cylindrical surface 26, and is compressibly loaded therebetween upon assembly of track joint 20. In its compressibly loaded state, no relative rotational movement occurs between load member 38 and radially extending end surface 27, or between load member 38 and second ceramic sealing member 44, due to the frictional forces between these elements. However, if it becomes necessary under certain conditions or applications, an appropriate adhesive can be interposed between load member 38 and radially extending end surface 27 or second ceramic sealing member 44 to aid in keeping these components relatively stationary.

In its compressibly loaded state, load member 38 also resiliently mounts and exerts a predetermined force on second ceramic sealing member 44 to urge the same into sealing engagement against first ceramic sealing member 42. Well known processes relating to the size, shape and makeup of load member 38 are used to design its urging function. The aforementioned characteristics of load member 38 can be manipulated to provide the high loads necessary to maintain the integrity of sealing interface 50 and therefore exclude debris from seal cavity 56. However, it should be appreciated that the aforementioned characteristics of load member 38 must also be designed to allow the relative rotational movement between first ceramic sealing member 42 and second ceramic sealing member 44 along sealing interface 50. Further details of how this relative rotational movement occurs during use of track chain 10 will be discussed with reference to FIGS. 5 and 6.

An important aspect of arranging the components of track seal assembly 34 in the above described manner, is that sealing interface 50 is the only dynamic sealing interface in the system. This is true since first ceramic sealing member 42 and second ceramic sealing member 44 are the only elements in track joint 20 which are slidably engaged with each other. As a result, track joint components, such as bushing face 28, are excluded from having any dynamic sealing functions. Furthermore, it should be appreciated that sealing interface 50 is a ceramic on ceramic interface rather than a plastic and/or rubber on metal (such as a bushing face) interface utilized by some prior art track seal assemblies. Since ceramic materials do not corrode, and are nearly impervious to abrasive materials, the serious durability problems associated with using plastic and/or rubber type sealing members in an abrasive or corrosive environment are avoided.

Load member 38 and its urging function are further designed to compress second ceramic sealing member 44 radially (utilizing the well know processes discussed above). This radial compression causes a circumferentially compressive hoop stress in the ceramic material from which second ceramic sealing member 44 is made. It should be understood that this is a favorable stress state that helps the ceramic material to accommodate larger bending loads, and thus reduce the probability that second ceramic sealing member 44 will be damaged by forces generated during the use of track chain 10.

It should be appreciated that load member 38 urges second ceramic sealing member 44 against first ceramic sealing member 42 by engaging a cone surface 46 disposed on second ceramic sealing member 44. This engagement forms a cone drive interface 48.

An important aspect of cone drive interface 48 is that it is angled relative to the longitudinal axis (represented by line 51 in FIG. 4) of bushing 16. Specifically, a cross section of the second ceramic sealing member 44 and the load member 38 defines a line at cone drive interface 48 which intersects line 51 at an obtuse angle. It should be understood that having cone drive interface 48 obtusely angled in the aforementioned manner has significant advantages. For example, the obtuse angle of cone drive interface 48 prevents any axial or radial movement or slipping (relative to longitudinal axis represented by line 51) between load member 38 and second ceramic sealing member 44 during rapid axial movement (as illustrated by arrows 52 and 54 in FIG. 4) or radial movement (as illustrated by arrows 53 and 55) that typically occurs between bushing 16 and track link 14 during the use of track chain 10.

The elastomeric nature of load member 38 also helps keep it in contact with second ceramic sealing member 44 during the aforementioned movements. This is true since a load member made of an elastomeric material is able to stretch and compress under the forces created by any relative movement between bushing 16 and track link 14. Therefore, an elastomeric material can accommodate this movement while keeping load member 38 and second ceramic sealing member 44 in contact, thereby maintaining the seal formed along cone drive interface 48 and sealing interface 50.

First ceramic sealing member 42 and second ceramic sealing member 44 are positioned between elastomeric material 40 and load member 38, and thus are not in direct contact with a metal surface. This is important since ceramic is somewhat brittle and can crack or break if subjected to forces while in direct contact with a hard metallic surface. Therefore, it should be appreciated that the ability of elastomeric material 40 and load member 38 to stretch and compress helps to isolate first ceramic sealing member 42 and second ceramic sealing member 44 from the potentially damaging forces generated during the movement of bushing 16 relative to track link 14.

Figure 5:
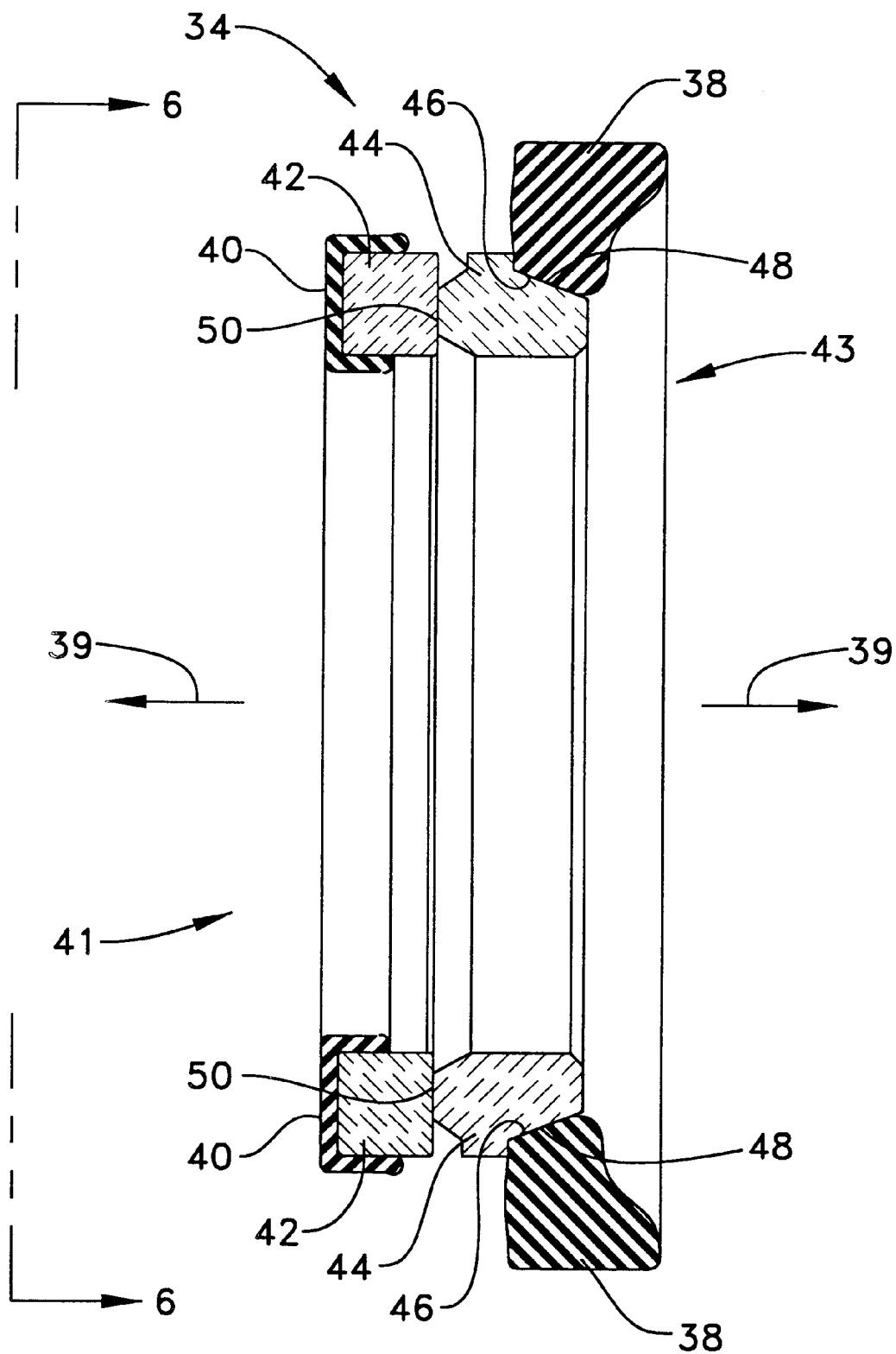
FIG. 5 is an elevational view of the track seal assembly shown in FIG. 3, with the bushing, track link, track pin and thrust ring removed for clarity of description.
Figure 6:
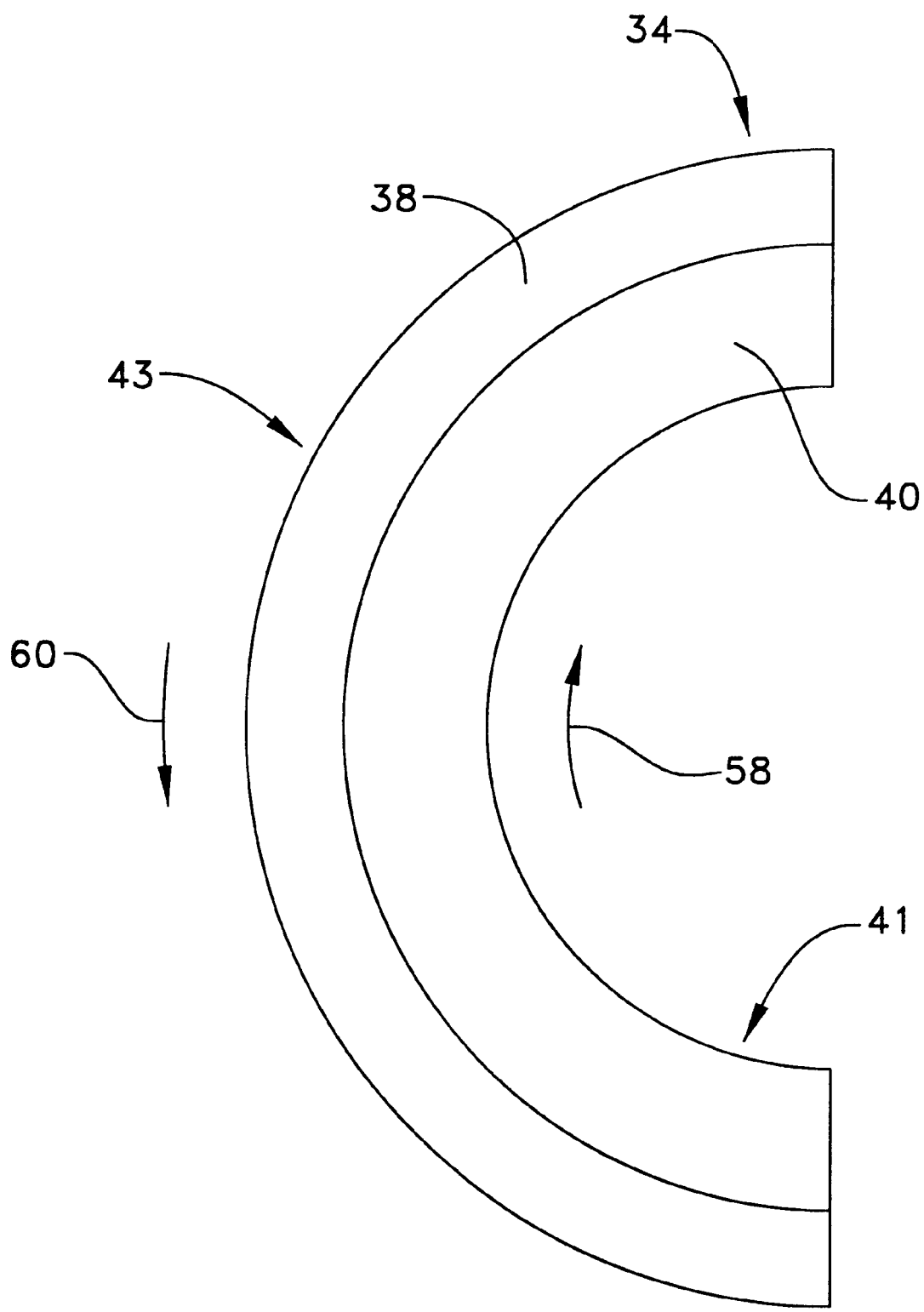
FIG. 6 is a view of the track seal assembly shown in FIG. 5, taken along line 6—6 of FIG. 5.

Now referring to FIGS. 5 and 6, there are shown enlarged illustrations of track seal assembly 34 with the bushing 16, track pin 18, thrust ring 24 and track link 14 removed for clarity of description. FIG. 6 is a view of track seal assembly 34 taken along line 6—6 of FIG. 5. As can be seen in FIG. 5, first ceramic sealing member 42 and material 40 form a first ring 41. While second ceramic sealing member 44 and load member 38 form a second ring 43. Note that only one half of the first ring 41 and second ring 43 are shown for clarity of description. First ring 41 and second ring 43 slidably contact each other along sealing interface 50 to form track seal assembly 34. As previously discussed, track seal assembly 34 defines an annulus in a substantially coaxial relationship with track pin 18 (track pin 18 not shown; however longitudinal axis 39 of track pin 18 is illustrated in FIG. 5).

As shown in FIG. 6, first ring 41 and second ring 43 are capable of rotational movement relative to each other. During this rotational movement, the first ring 41 and the second ring 43 are in frictional contact with each other at interface 50 (see FIG. 5). For example, first ring 41 can be rotated in a clockwise direction as indicated by arrow 58, while second ring 43 is being rotated in a counter clockwise direction as indicated by arrow 60. Also, first ring 41 can be rotated in the direction indicated by arrow 60 (counterclockwise) while second ring 43 is being rotated in the direction indicated by arrow 58 (clockwise).

An example of how the above described relative movement between rings 41 and 43 can occur during the use of track seal assembly 34 in track joint 20 (not shown; see FIGS. 3 and 4) is as follows. As discussed previously, the components of first ring 41 (i.e. elastomeric material 40 and first ceramic sealing member 42) do not rotate relative to each other or relative to bushing 16 (see FIG. 4). Additionally, the components of second ring 43 (i.e. second ceramic sealing member 44 and load member 38) do not rotate relative to each other or relative to track link 14 (see FIG. 4). Therefore, if during the use of track chain 10 (see FIG. 1) bushing 16 has rotational movement around its longitudinal axis in the direction indicated by arrow 58, and track link 14 has rotational movement around its longitudinal axis in the direction indicated by arrow 60, there must be a corresponding relative rotation along sealing interface 50 between first ring 41 and second ring 43. An important aspect of the ability of track seal assembly 34 to move in the above described manner is that it allows the relative rotational movement of bushing 16 and track link 14 while maintaining the integrity of seal cavity 56. Therefore, a lubricant is effectively retained within, and debris is effectively excluded from, seal cavity 56.

Now referring to FIGS. 7–12 there are shown views of track joints somewhat similar to the one shown in FIG. 4. Specifically, several track joints defining an annular chamber in coaxial relationship with a track pin are shown in FIGS. 7–12. Moreover, as with track joint 20 (see FIG. 4), the track joints shown in FIGS. 7–12 are formed by providing a cylindrical bushing having a bushing face thereon, wherein the bushing face is positioned in an opposing relationship to a track link counter bore (see discussion relating to FIG. 3). Each of FIGS. 7–12 illustrate an additional embodiment of a track seal assembly of the present invention. Each of the track seal assemblies illustrated in FIGS. 7–12 have somewhat similar structural characteristics, are used in much the same way, operate in essentially the same way as described in reference to FIGS. 5 and 6, and have many of the same advantages as described above in reference to FIGS. 3–6. However, each also has specific advantages which are pointed out and discussed below with reference to FIGS. 7–12.

Figure 7:
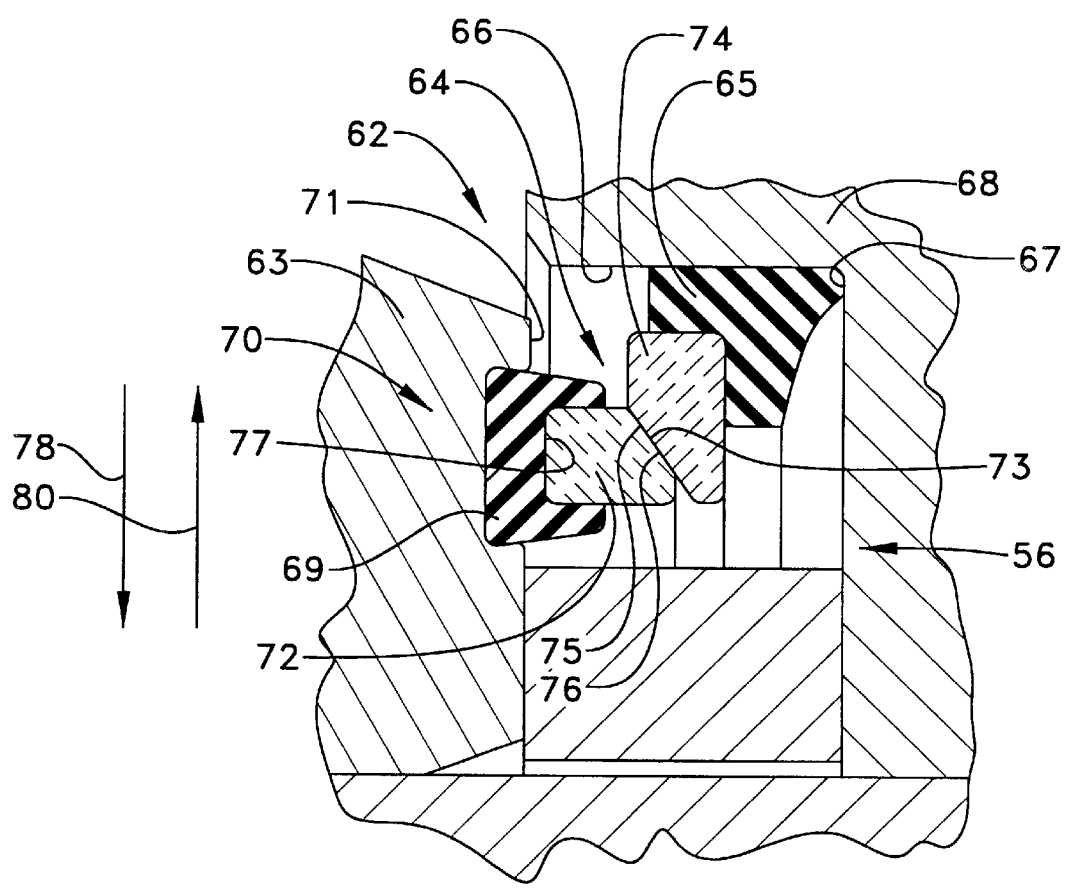
FIG. 7 is an enlarged cross sectional view of a second embodiment of the track seal assembly of the present invention.

Now referring to FIG. 7, there is shown a track joint 62. Disposed within track joint 62 is a track seal assembly 64. Track seal assembly 64 is a second embodiment of the track seal assembly of the present invention. Track seal assembly 64 includes an elastomeric shear pad 69 having a receptacle 77 defined therein. The elastomeric shear pad 69 is disposed in a bushing face counter bore 70. Elastomeric shear pad 69 is designed such that when placed in bushing face counter bore 70, it extends outwardly from bushing face 71 and no portion of receptacle 77 resides within bushing face counter bore 70. A first ceramic sealing member 72 having a cone surface 73 defined thereon is positioned in receptacle 77 as shown in FIG. 7.

Track seal assembly 64 also includes a second ceramic sealing member 74 positioned within track joint 62. The second ceramic sealing member has a cone surface 75 defined thereon. Second ceramic sealing member 74 is positioned within track joint 62 such that its cone surface 75 slidably contacts the cone surface 73 of first ceramic sealing member 72 to form a sealing cone interface 76.

Track seal assembly 64 further includes an elastomeric load member 65 positioned between axial extending cylindrical surface 66, radially extending end surface 67 and second ceramic sealing member 74. Elastomeric load member 65 mounts second ceramic sealing member 74 in track joint 62, and exerts a predetermined force on second ceramic sealing member 74 to urge the same into sliding sealing engagement against first ceramic sealing member 72 along cone interface 76. Thus cone surfaces 73 and 75 form the dynamic sealing surfaces of track seal assembly 64.

One advantage of having the components of track seal assembly 64 shaped and arranged in the above described manner, is that the cone interface 76 prevents any axial or radial movement or slipping between first ceramic sealing member 72 and second ceramic sealing member 74 during rapid movements between components of track joint 62 (i.e. axial or radial movements between bushing 63 and track link 68). This reduces the amount of debris which can come into contact with cone interface 76.

Moreover, bushing 63 and a track link 68 (and therefore first ceramic sealing member 72 and second ceramic sealing member 74, respectively) typically move in radial directions, as represented by arrows 78 and 80 during use of the track chain. Therefore, it is often the case that first ceramic sealing member 72 is forced to move in the radial direction indicated by arrow 80, while at the same time, second ceramic sealing member 74 is forced to move in the radial direction indicated by arrow 78. This type of movement can impart an undesirable shear force along cone interface 76 and result in a potentially damaging stress on first ceramic sealing member 72 and second ceramic sealing member 74.

To address this problem elastomeric shear pad 69 is designed to flex and bend in the same radial direction as indicated by arrows 78 and 80. Therefore, having first ceramic sealing member 72 disposed within elastomeric shear pad 69, allows it to accommodate the aforementioned radial movements. This accommodation reduces shear force that is imparted along cone interface 76 by these radial movements, and thus reduces the stress on first ceramic sealing member 72 and second ceramic sealing member 74.

Figure 8:
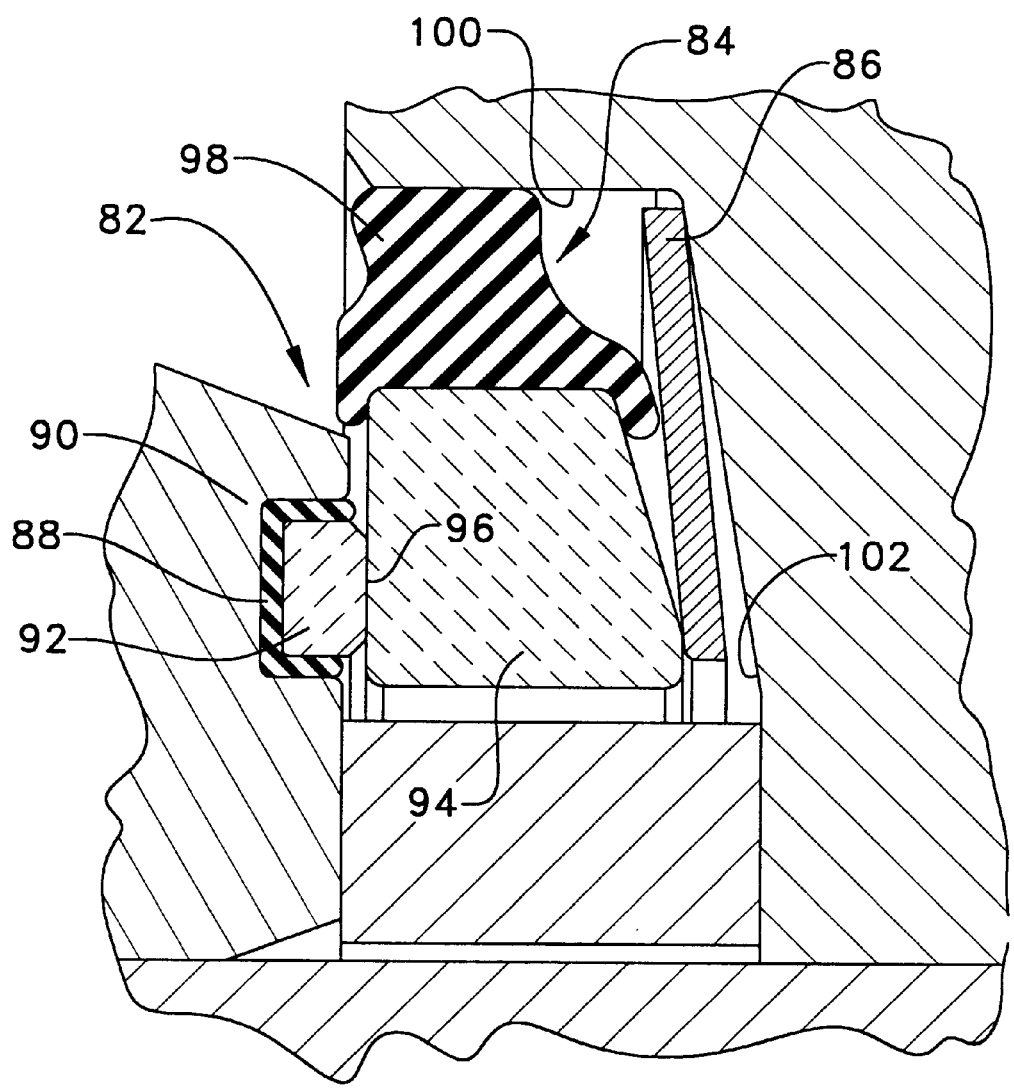
FIG. 8 is an enlarged cross sectional view of a third embodiment of the track seal assembly of the present invention.

Now referring to FIG. 8, there is shown a track joint 82. Disposed within track joint 82 is track seal assembly 84. Track seal assembly 84 is a third embodiment of the track seal assembly of the present invention. Track seal assembly 84 includes elastomeric material 88 disposed in a bushing face counter bore 90. A first ceramic sealing member 92, having a nearly rectangular shaped cross section, is positioned in bushing face counter bore 90 in frictional engagement with elastomeric material 88.

Track seal assembly 84 also includes an annular elastomeric diaphragm 98 extending downwardly from axial extending cylindrical surface 100. A second ceramic sealing member 94, having a nearly rectangular shaped cross section, is nested within diaphragm 98 such that it is mounted in track joint 82 and slidably contacts first ceramic sealing member 92 to form a sealing interface 96. Note that no rotational movement occurs between second ceramic sealing member 94, diaphragm 98, and axial extending cylindrical surface 100.

Track seal assembly 84 further includes a load member in the form of a belleville spring 86. Belleville spring 86 is interposed between second ceramic sealing member 94 and radially extending end surface 102. As previously discussed with other load members of the present invention, belleville spring 86 exerts a force on second ceramic sealing member 94 to urge the same into sliding contact against first ceramic sealing member 92 along dynamic sealing interface 96.

Using elastomeric diaphragm 98 and a belleville spring 86 in the above described manner allows second ceramic sealing member 94 to have a nearly rectangular or square cross section. This is in contrast to using a load member to both mount and axially urge a second ceramic sealing member into sealing engagement with a first ceramic sealing member. This is true since using a load member in the aforementioned arrangement typically requires the second ceramic sealing member to have a more complex shape (i.e. a cone surface to engage the load member) to communicate the necessary radial and axial forces along appropriate vectors to mount the second sealing member in the track joint and axially urge the same to form a dynamic sealing interface against a cooperating sealing member.

A benefit of using a second sealing member having a nearly rectangular cross section is that it is significantly cheaper to manufacture than those having a more complex cross section (i.e. cone surfaces). Thus, track seal assembly 84 is simpler and cheaper to manufacture than those requiring a second sealing member having a relatively complex cross section.

Figure 9:
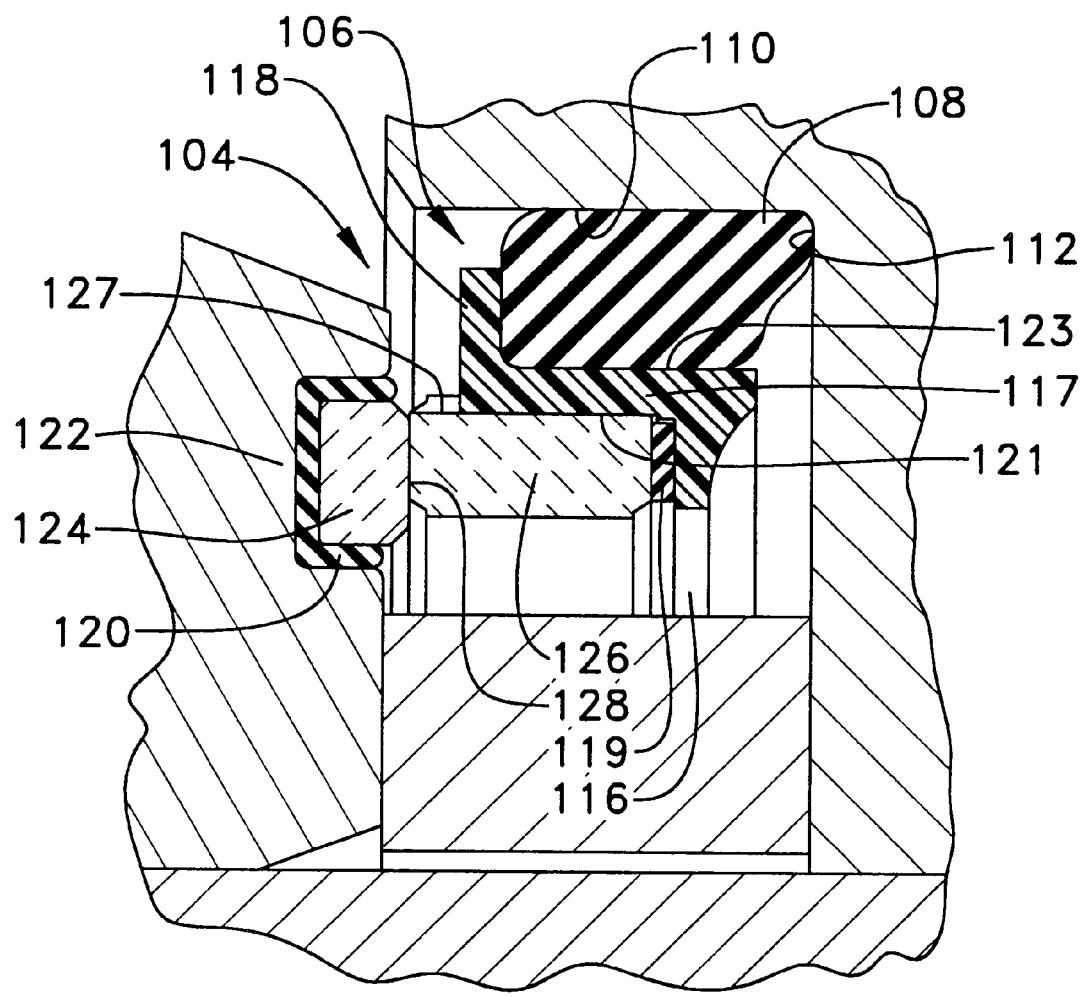
FIG. 9 is an enlarged cross sectional view of a fourth embodiment of the track seal assembly of the present invention.

Now referring to FIG. 9, there is shown a track joint 104 having a track seal assembly 106 disposed therein. Track seal assembly 106 is a fourth embodiment of the track seal assembly of the present invention. Track seal assembly 106 includes an elastomeric material 120 disposed in a bushing face counter bore 122. A first ceramic sealing member 124, having a nearly rectangular shaped cross section, is positioned in bushing face counter bore 122 in frictional engagement with elastomeric material 120.

Track seal assembly 106 further includes a ring-shaped holding member 116 having an axially extending annular flange 117 which defines a circular receptacle. A gasket 119 is disposed in the circular receptacle. Holding member 116 also has an upwardly, radially extending, wall 118. Axially extending annular flange 117 has an inner surface 121 and a top surface 123. Inner surface 121 has a number of circumferentially spaced axially extending ridges (not shown) thereon.

A second ceramic sealing member 126, having a generally rectangular shaped cross section, is also provided. Second ceramic sealing member 126 has an outer surface 127 which has a number of circumferentially spaced, axially extending grooves (not shown) thereon. Second ceramic sealing member 126 is nested in the receptacle defined by axially extending annular flange 117 in contact with gasket 119. Second ceramic sealing member 126 is further positioned relative to holding member 116 such that the ridges on inner surface 121 enter the grooves on outer surface 127 to prevent any rotational motion between second ceramic sealing member 126 and holding member 116. Second ceramic sealing member 126 and holding member 116 are positioned within track joint 104 such that second ceramic sealing member 126 slidably contacts first ceramic sealing member 124.

Track seal assembly 106 further includes an elastomeric load member 108 positioned between axial extending cylindrical surface 110, radially extending end surface 112 and holding member 116. Load member 108 engages top surface 123 to resiliently mount holding member 116 and second ceramic sealing member 126 in track joint 104. Load member 108 also engages radially extending wall 118 thereby exerting an axial force on second ceramic sealing member 126 toward first ceramic sealing member 124 thereby forming dynamic sealing interface 128.

An advantage of using second ceramic sealing member 126 and holding member 116 in the above described manner is it that they provide an arrangement which allows second ceramic sealing member 126 to have a nearly rectangular shaped cross section and still be (1) mounted in track joint 104 and (2) urged toward first ceramic sealing member 124 by a single element i.e. load member 108. Thus, the expense of manufacturing a second ceramic sealing member having a relatively complex cross section (e.g. a number of cone surfaces) is avoided.

Figure 10:
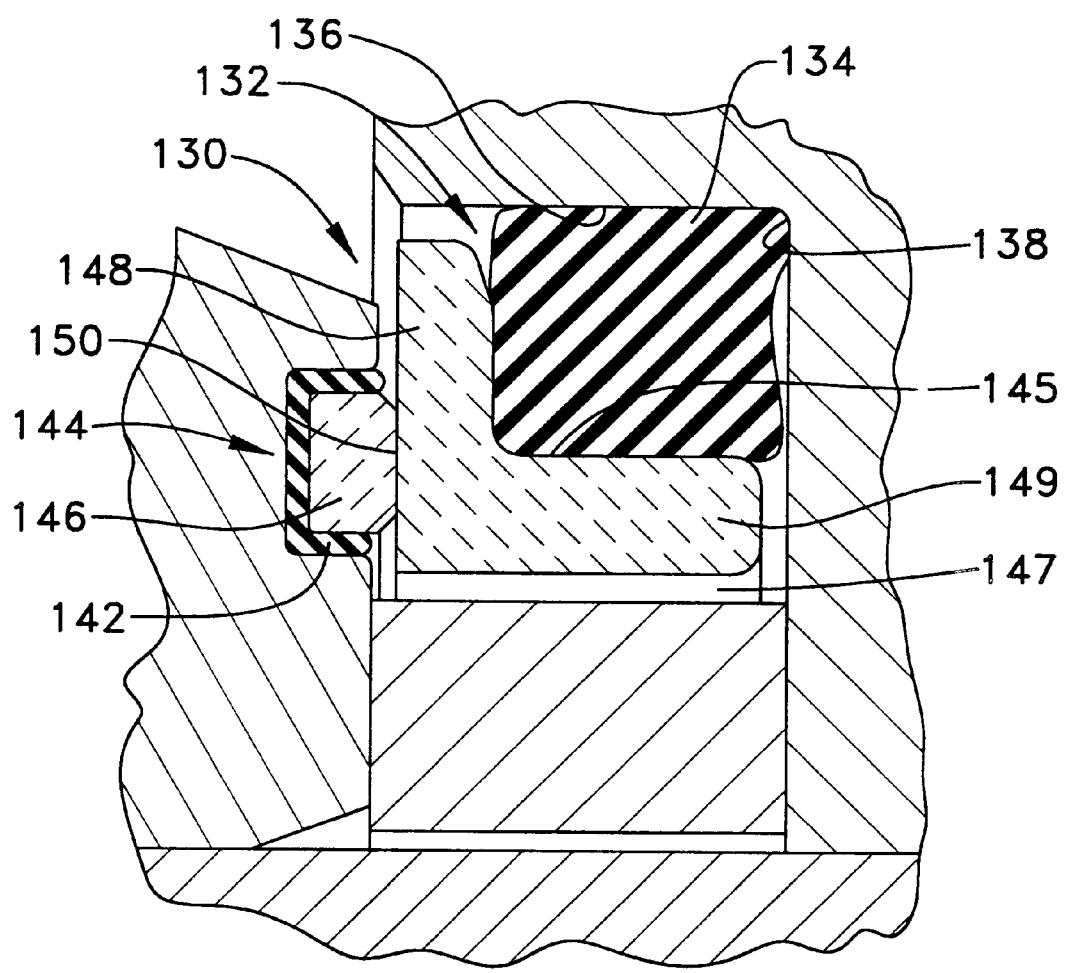
FIG. 10 is an enlarged cross sectional view of a fifth embodiment of the track seal assembly of the present invention.

Now referring to FIG. 10, there is shown a track joint 130 having a track seal assembly 132 disposed therein. Track seal assembly 132 is a fifth embodiment of the track seal assembly of the present invention. Track seal assembly 132 includes an elastomeric material 142 disposed in a bushing face counter bore 144. A first ceramic sealing member 146, having a nearly rectangular shaped cross section, is positioned in bushing face counter bore 144 in frictional engagement with elastomeric material 142.

Track seal assembly 132 also includes a second ceramic sealing member 147 having a generally L-shaped cross section. The L-shaped cross section of second ceramic sealing member 147 defines a radially extending arm portion 148 and an axially extending arm portion 149. Arm portions 148 and 149 define a seat portion 145 which is disposed in a diagonally opposed relationship to axial extending cylindrical surface 136 and radially extending end surface 138 of track joint 130. Second sealing member 147 is further disposed in track joint 130 such that radially extending arm portion 148 slidably contacts first ceramic sealing member 146.

Track seal assembly 132 further includes an elastomeric load member 134 positioned between axial extending cylindrical surface 136, radially extending end surface 138 and second ceramic sealing member 147. Load member 134 is further positioned such that it engages seat portion 145, thereby resiliently mounting second ceramic sealing member 147 in track joint 130. The engagement of load member 134 with seat portion 145 also serves the purpose of exerting an axial force on second ceramic sealing member 147 to urge the same against first ceramic sealing member 146 thereby forming dynamic sealing interface 150.

The generally L-shaped cross section of second ceramic sealing member 147 allows the same to be mounted in track joint 130 and urged toward first ceramic sealing member 146 by a single element, that is load member 134. The use of a single element to mount and urge second ceramic sealing member 147 decreases the complexity of track seal assembly 132, and thus reduces its manufacturing costs.

Figure 11:
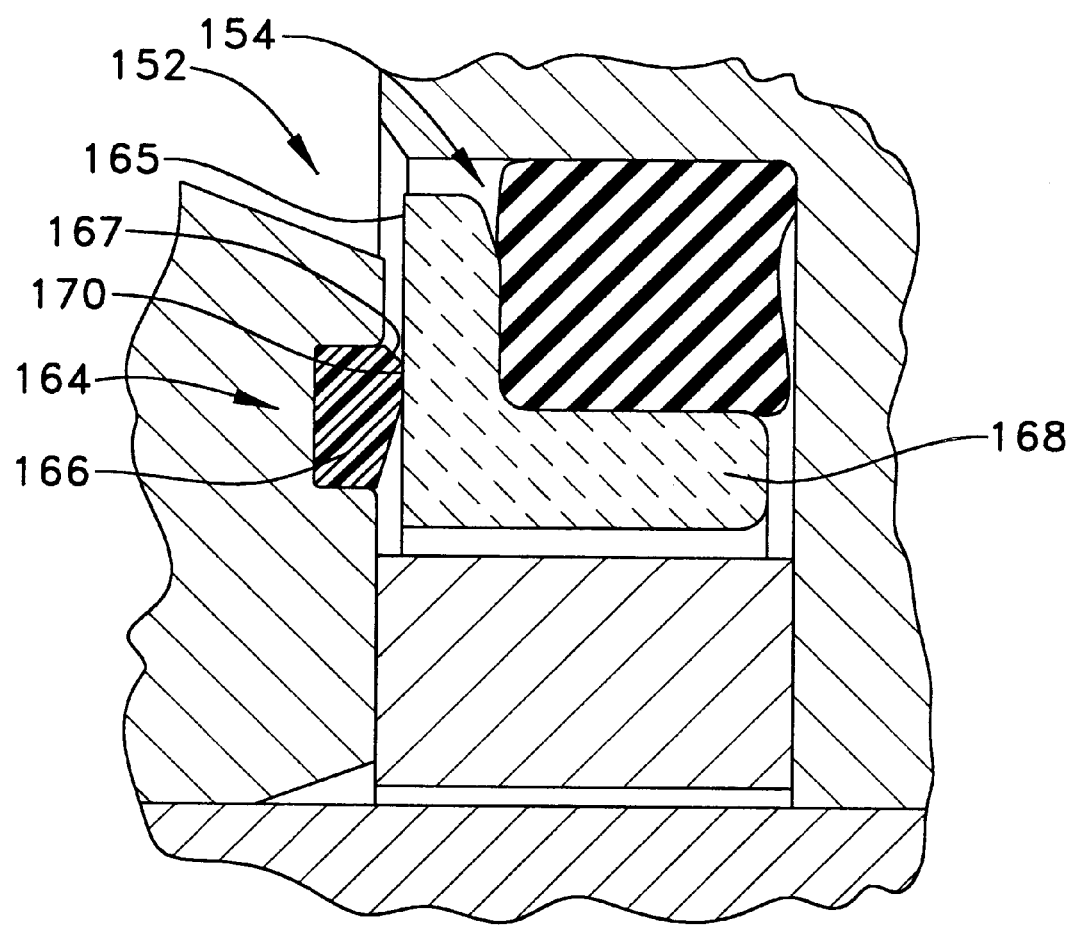
FIG. 11 is an enlarged cross sectional view of a sixth embodiment of the track seal assembly of the present invention.

Now referring to FIG. 11, there is shown track joint 152 having a track seal assembly 154 disposed therein. Track seal assembly 154 is a sixth embodiment of the track seal assembly of the present invention. Track seal assembly 154 is similar to track seal assembly 132 illustrated in FIG. 10. However, track seal assembly 154 has an elastomeric sealing member 166 (for example a sealing member made out of urethane) disposed in bushing face counter bore 164, rather than a ceramic sealing member. Elastomeric sealing member 166 frictionally engages surfaces of bushing face counter bore 164 such that it remains stationary thereto, and provides a static seal therebetween during operation of track joint 152. Elastomeric sealing member 166 includes an axially extending lip 167 protruding outward from bushing face counter bore 164, which contacts a surface 165 on ceramic sealing member 168.

Note that ceramic sealing member 168 has a generally L-shaped cross section and is mounted in track joint 152, and urged toward elastomeric sealing member 166 to form dynamic sealing interface 170, in the same manner as described in reference to FIG. 10.

A benefit of using elastomeric sealing member 166 is that, in contrast to a sealing member made from a ceramic material, elastomeric sealing member 166 can conform to any irregularities (bumps, ridges, etc.) present on surface 165 of ceramic sealing member 168. Therefore, the aforementioned irregularities will not compromise the integrity of dynamic sealing interface 170. Thus, ceramic sealing member 168 can be manufactured with somewhat relaxed tolerances relating to the flatness of surface 165 as compared to when two ceramic sealing members engage to form a dynamic sealing interface. The relaxed tolerances required for ceramic sealing member 168 allow it to be manufactured relatively cheaply, thereby reducing the cost of track seal assembly 154.

Referring now to FIG. 12, there is shown a track joint 172 having a track seal assembly 174 disposed therein. Track seal assembly 174 is a seventh embodiment of the track seal assembly of the present invention. Track seal assembly 174 is essentially the same as track seal assembly 34, illustrated in FIG. 4, with respect to the design of, and cooperation between, load member 176 and ceramic sealing member 186. However, instead of load member 176 axially urging ceramic sealing member 186 into sliding engagement with another ceramic sealing member, it axially urges ceramic sealing member 186 into sliding engagement with a ceramic bushing face 187. The engagement of ceramic sealing member 186 with ceramic bushing face 187 thus forms a dynamic sealing interface 192. It should be understood that ceramic bushing face 187 can be obtained by attaching the same to a conventional (e.g. metal) bushing, or providing a bushing 184 made entirely of a ceramic material.

The advantages of track seal assembly 174 include eliminating the need for a track face counter bore and a second sealing member, thereby reducing the effort required to manufacture the same.

While the invention has been illustrated and described in detail in the drawings and foregoing description, such illustration and description is to be considered as exemplary and not restrictive in character, it being understood that only the preferred embodiments have been shown and described and that all changes and modifications that come within the spirit of the invention are desired to be protected.

What is claimed is:

1. A track seal assembly adapted to seal a track joint, comprising:

a track link;

a ceramic seal member;

a spring member positioned between said track link and said ceramic seal member;

a bushing having a ceramic end face; and wherein said spring member forces said ceramic seal member into contract with said ceramic end face of said bushing so as to form a seal interface by axially urging said ceramic seal member into sliding engagement with said ceramic end face of said bushing.

2. The track seal assembly of claim 1, wherein said spring member includes an elastomeric member.

3. The track seal assembly of claim 1, wherein said bushing is made of a ceramic material.

\* \* \* \* \*